United States Patent
Katsuma et al.

[11] Patent Number: 5,889,749
[45] Date of Patent: Mar. 30, 1999

[54] OPTICAL PICKUP APPARATUS

[75] Inventors: Toshiaki Katsuma; Katsuo Katagiri; Takayuki Saito, all of Omiya, Japan

[73] Assignee: Fuji Photo Optical Co., Ltd., Omiya, Japan

[21] Appl. No.: 950,980

[22] Filed: Oct. 15, 1997

Related U.S. Application Data

[63] Continuation-in-part of Ser. No. 912,526, Aug. 18, 1997, abandoned, which is a continuation of Ser. No. 576,758, Dec. 21, 1995, abandoned.

[30] Foreign Application Priority Data

Apr. 27, 1995 [JP] Japan .................................. 7-104391

[51] Int. Cl.$^6$ .................................................. G11B 7/00
[52] U.S. Cl. .............................................. 369/112; 369/58
[58] Field of Search .................................. 369/47, 53, 54, 369/58, 94, 100, 112, 116, 118, 119

[56] References Cited

U.S. PATENT DOCUMENTS

| | | | |
|---|---|---|---|
| 5,097,464 | 3/1992 | Nishiuchi et al. | 369/112 |
| 5,235,581 | 8/1993 | Miyagawa et al. | 369/112 X |

FOREIGN PATENT DOCUMENTS

03-54740  3/1991  Japan .

Primary Examiner—Paul W. Huber
Attorney, Agent, or Firm—Ronald R. Snider

[57] ABSTRACT

In an optical pickup apparatus which can be commonly used for a plurality of optical disks having different thickness values, thickness t of a optical transparent plane plate for thickness compensation is set by means of skew ray formula so that the amount of spherical aberration caused by the optical system is lowered, thus allowing accurate focusing for each of a plurality of optical disks having different thickness values. Spherical aberration S.A. is given by expression of $S.A.=S'_k-S'_{k0}$, wherein $S'_k$ is computed by expression of $S'_k=Ax_k-(X'_k/Y'_k)Ay_k$. Here, by setting $S'_k-S'_{k0}$=minimal value, the geometric thickness of the plane plate 8 can be determined.

3 Claims, 7 Drawing Sheets

OPTICAL PICKUP APPARATUS

RELATED APPLICATION

The present application is a continuation-in-part of U.S. patent application Ser. No. 08/912,526 filed on Aug. 18, 1997, now abandoned, which is a continuation of U.S. patent application Ser. No. 08/576,758 filed on Dec. 21, 1995, now abandoned.

BACKGROUND OF THE INVENTION

1. Field of the Invention

The present invention relates to an optical pickup apparatus for reproducing signals recorded in optical disks and, in particular, to an optical pickup apparatus which can reproduce signals from a plurality of kinds of optical disks having thickness values different from each other.

2. Description of the Prior Art

Optical disks have been used as various recording media since they have a high recording density and a large capacity while being excellent in random access characteristics.

Accordingly, as the kinds of the optical disks, there have been known various types such as CD (compact disk), DVD (digital video disk), and LD (laser disk) according to their uses and fields of utilization.

Figure 11:
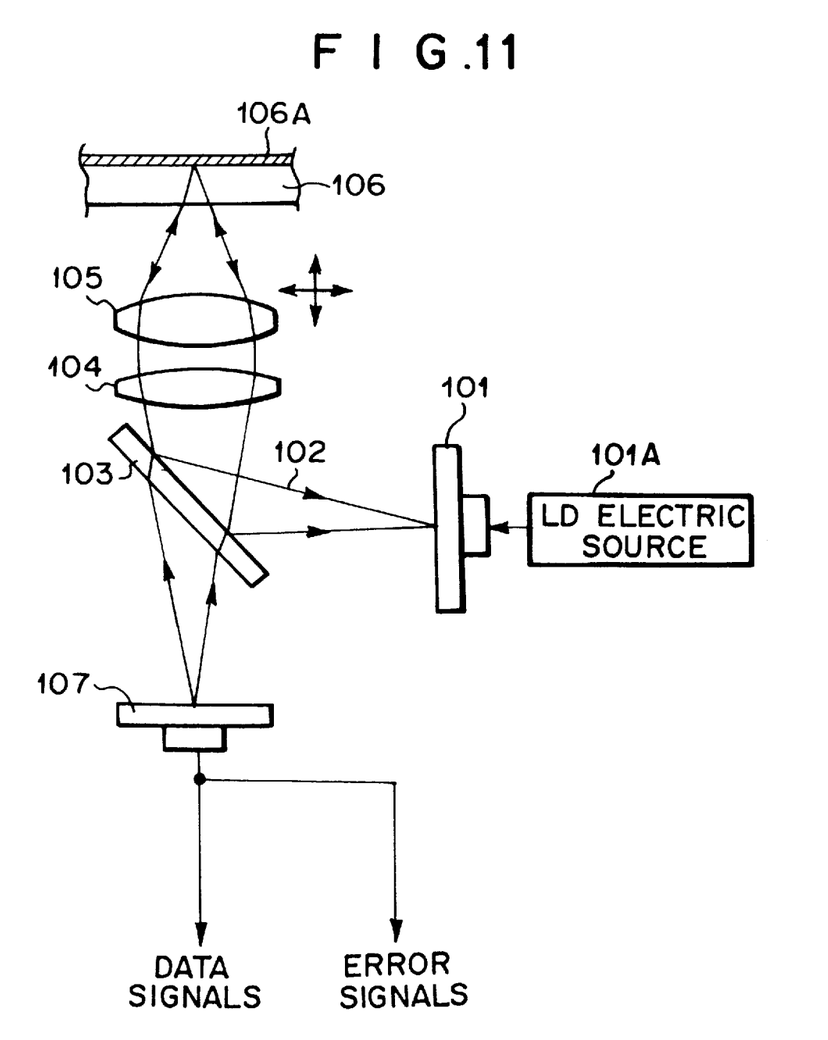
FIG. 11 is a schematic view showing a conventional optical pickup apparatus.

Regardless of the kinds of the optical disks, optical pickup apparatuses for reproducing signals from these various types of the optical disks have substantially the same configuration such as that shown in FIG. 11.

Namely, in general, in the optical pickup apparatus, a laser beam 102 output from a semiconductor laser 101 is focused on a recording surface 106A of an optical disk 106 by an objective lens 105 by way of a half mirror 103 and a collimator lens 104. Light returning from the recording surface 106A enters a four-divided photodiode 107 by way of the objective lens 105, the collimator lens 104, and the half mirror 103 so that a data signal and an error signal (e.g., focus error signal and tracking error signal) are obtained. Also, in response to this error signal, the above-mentioned objective lens 105 is moved up and down as well as left and right to effect focus control and tracking control.

As mentioned above, since the optical pickup apparatus has substantially the same configuration with respect to various kinds of optical disks, there can be constructed a so-called compatible player in which a single optical pickup apparatus is used for reproducing signals from various kinds of optical disks. Such a compatible player is convenient in that various kinds of player apparatuses do not have to be prepared so as to correspond to the kinds of the optical disks.

Meanwhile, thickness or NA of these optical disks often varies according to their kinds. In particular, their thickness may vary greatly. For example, though CD and DVD have the same diameter of 120 mm, the thickness of the CD is standardized at 1.2 mm, whereas the DVD has a standard thickness of 0.6 mm.

Also, the LD has a configuration in which two sheets of single-plate disks each having a thickness of 1.2 mm are bonded together with their recording surfaces facing inside. The thickness of its half side is 1.2 mm which is the same as the thickness of the CD. However, while the CD and DVD have a protective plate made of PC (polycarbonate) resin in general, the LD has a protective plate made of acrylic resin in general. As a result, the refractive indexes of these resins differ from each other, thereby making the optical thickness of the LD different from that of the CD and DVD.

Therefore, when a single optical pickup is commonly used for a plurality of kinds of optical disks having geometric or optical thickness values different from each other, a remarkable aberration may occur due to their difference from the thickness of a basically designed optical disk, thereby making it difficult to effect focusing.

Accordingly, there have been proposed techniques in which, when the same optical pickup apparatus is commonly used for a plurality of optical disks whose geometric or optical thickness values differ from each other, an optical transparent plate for compensating for the this thickness difference is inserted into and retracted from the space between the optical disk and the objective lens (see Japanese Unexamined Patent Publication No. 3-54740, U.S. Pat. No. 5,097,464, and, if necessary, U.S. Pat. No. 5,235,581).

Nevertheless, aberration, such as spherical aberration in particular, may not always be improved when the refractive index or thickness of the optical transparent plate is determined simply on the basis of the difference in geometric or optical thickness.

Namely, since light beams are incident on the optical transparent plate with various incident angles, spherical aberration is mainly generated in the luminous flux emanating therefrom.

Accordingly, it is difficult to perform accurate focusing in the optical pickup apparatus unless the refractive index or thickness of the optical transparent plate is set so that such spherical aberration becomes favorable.

SUMMARY OF THE INVENTION

In view of these circumstances, it is an object of the present invention to provide an optical pickup apparatus which enables accurate focusing with respect to a plurality of kinds of optical disks having geometric or optical thickness values different from each other.

The optical pickup apparatus in accordance with the present invention comprises:

an objective lens for focusing, on an optical disk, a light beam from a laser source;

an optical transparent plane plate for compensating for optical path length, which is disposed outside the light beam when the optical disk is a first optical disk having an optical thickness set to T and disposed in the light beam when the optical disk is a second optical disk having an optical thickness set to $T_2$ which is smaller than $T_1$, the optical transparent plane plate having an optical thickness set to t;

a plane-plate moving actuator for effecting an operation for inserting the optical transparent plane plate into the light beam and an operation for retracting the optical transparent plane plate from the light beam; and a controller for ordering the plane-plate moving actuator to change over between the operations for inserting and retracting the optical transparent plane plate according to a kind of the optical disk which is set;

wherein the optical thickness t of the optical transparent plane plate is set by means of skew ray formula so that an amount of spherical aberration caused by an optical system disposed in the light beam is set so as to be smaller than that obtained when t is set to $T_1 - T_2$.

Preferably, the amount of spherical aberration is defined by the following expression (1):

$$\text{amount of spherical aberration} = S'_k - S'_{k0} \quad (1)$$

wherein:

$S'_k = Ax_k - (X'_k / Y'_k) Ay_k;$ k is the last lens surface;

S'$_{k0}$ is a distance from the k surface to a Gaussian image surface;

Ax$_k$ and Ay$_k$ are respectively X component and Y component of a vector indicating a position of the light beam passing through the k surface where an intersection between the k surface and an optical axis is defined as an origin (origin of coordinates); and X'$_k$ and Y'$_k$ are respectively X component and Y component of a unit vector indicating a direction of the light beam having passed through the k surface.

Here, the coordinate system is a left-hand system in which the direction of X axis is defined as the optical axis direction.

Preferably, a minimum level of the amount of spherical aberration caused by the optical system is defined by a minimum value of a square root of sum of squares of amounts of spherical aberration of respective light beams passing through the optical system.

Here, "optical thickness" refers to a value obtained when a geometric thickness, which is the actual spatial thickness of a material, is multiplied by the refractive index of the material.

In the above-mentioned optical pickup apparatus, the first optical disk having a large optical thickness is irradiated with the light beam without by way of the optical transparent plane plate for compensating for optical path length, whereas the second optical disk having a small optical thickness is irradiated with the light beam by way of the optical transparent plane plate. The optical thickness of the plane plate is set by means of skew ray formula so that an amount of spherical aberration caused by the optical system disposed in the light beam is set so as to be smaller than that obtained when t is set to $T_1-T_2$. Accordingly, the same optical pickup apparatus can be commonly used for the above-mentioned two kinds of disks. Also, even in the case where signals are reproduced from the second optical disk, the amount of spherical aberration can be made smaller, thus improving the focusing accuracy.

DETAILED DESCRIPTION OF THE PREFERRED EMBODIMENTS

In the following, embodiments of the present invention will be explained with reference to the accompanying drawings.

Figure 1:
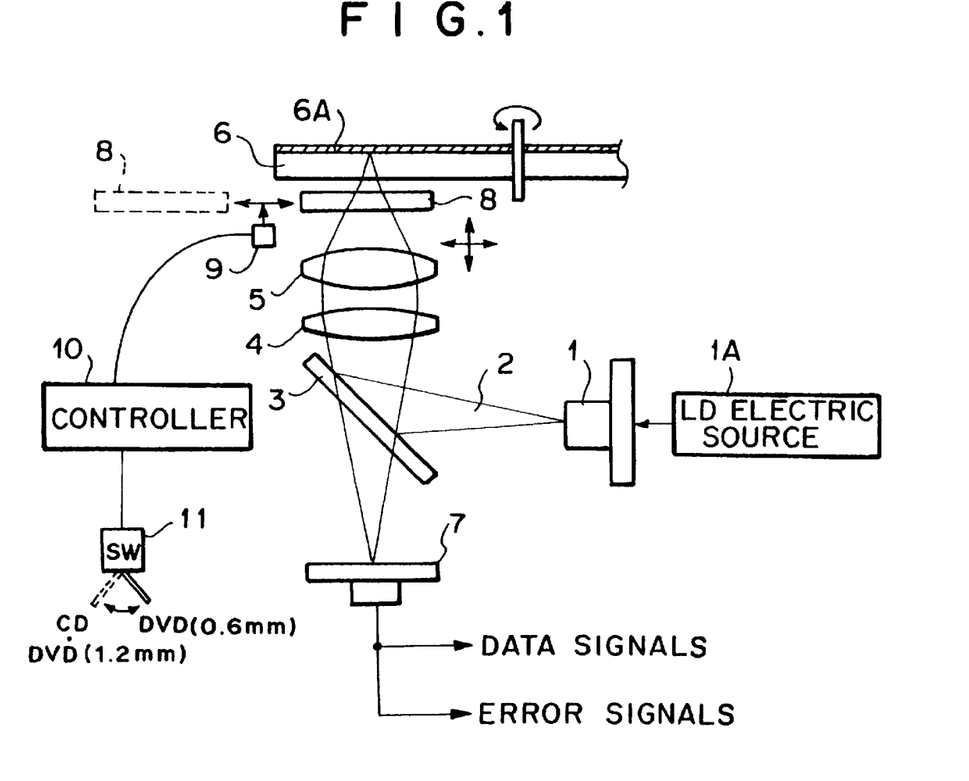
FIG. 1 is a schematic view showing an optical pickup apparatus in accordance with an embodiment of the present invention.

FIG. 1 is a schematic view showing an optical pickup apparatus in accordance with an embodiment of the present invention. In this optical pickup apparatus, electricity is supplied from an LD electric source 1A to a semiconductor laser 1 so as to make it emit a laser beam 2 (having a wavelength of 635 nm, for example). This laser beam 2 is reflected by a half mirror plane plate 3 and then is turned into a collimated beam by a collimator lens 4. Thus collimated beam is turned into a convergent beam by an object lens 5 and impinges on a recording surface 6A of an optical disk 6.

On the recording surface 6A, pits carrying signal information are arranged like a track. From this recording surface 6A, the reflected light component of the laser beam 2, while carrying the signal information, enters the half mirror plane plate 3 by way of the objective lens 5 and the collimator lens 4. Then, it passes through the half mirror plane plate 3 so as to enter a four-divided photodiode 7. In this photodiode 7, the amounts of light received at the divided four diode positions are respectively calculated so as to obtain a data signal as well as respective error signals for focusing and tracking.

Since the half mirror plane plate 3 is inserted with inclination of 45 degrees with respect to the optical path of the light returning from the optical disk 6, it acts like a cylindrical lens. Accordingly, the light beam having passed through the half mirror plane plate 3 has an astigmatism. Thus, the degree of error in focus is determined according to the shape of the beam spot of the returning light on the four-divided photodiode 7. The collimator lens 4 may be omitted according to circumstances. Also, a grating may be inserted between the semiconductor laser 1 and the half mirror plane plate 3 such that the tracking error can be detected by three beams.

This optical pickup apparatus is configured such that signals can be reproduced from the optical disk 6 which may be any of CD and DVD.

The geometric thickness of CDs is standardized at 1.2 mm, while the DVDs have a standard geometric thickness of 0.6 mm. The above-mentioned optical pickup apparatus can securely effect focusing with the optical disk 6 of any of these types.

Both CD and DVD have a protective plate made of PC (polycarbonate; refractive index nD=1.514). Also, their NA values are set to 0.37 for the former (in which one with NA of 0.37 can be used since a wavelength shorter than 780 nm is used) and 0.6 for the latter.

In order to securely effect focusing with respect to both of the above-mentioned CD and DVD, influence of their difference in optical thickness, such as influence of spherical aberration in particular, is compensated for by a plane plate 8 which is transparent to the laser beam 2. When the plane plate 8 is made of PC which is the same material as that of the protective plate of the CD and DVD, the plane plate 8 can be simply set to the thickness of 0.6 mm that is the above-mentioned geometric thickness difference. When it is not made of the same material, by contrast, its thickness t must to be determined by means of the following formula for tracing skew ray.

Explained in the following is a technique for determining, by means of skew ray tracing formula, the optical thickness of the plane plate 8 so that the amount of spherical aberration is minimized.

Here, it is assumed that x axis is set in the optical axis direction of the optical system, and y axis and z axis are set so as to be perpendicular thereto. In the following explanation, it is assumed that $X_{v+1}$ equals to $X'_v$, $Y_{v+1}$ equals to $Y'_v$, and $Z_{v+1}$ equals to $Z'_v$.

Figure 4:
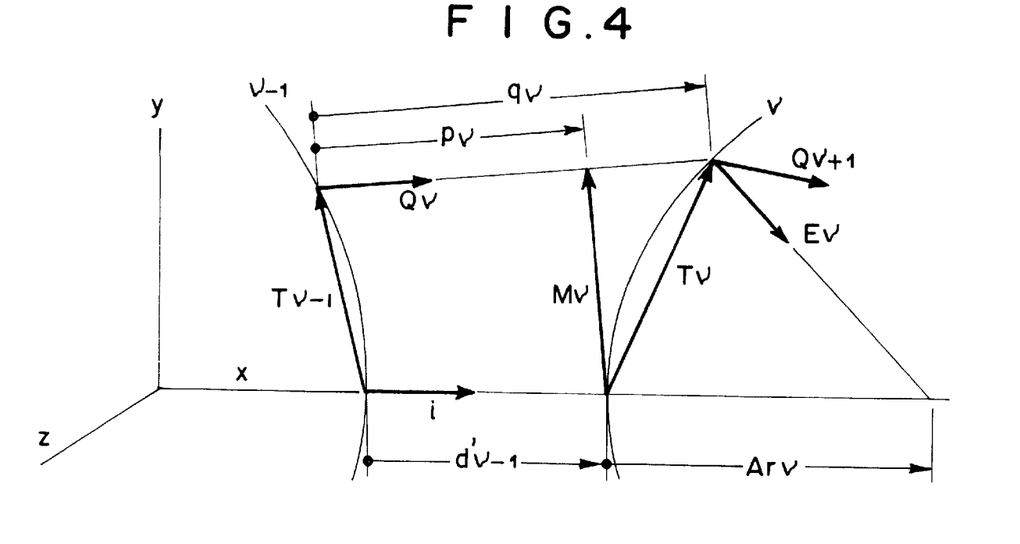
FIG. 4 is a graph for explaining the embodiment of the present invention.

Here, the path of a given light beam is to be computed through the optical system. To this end, when a given surface v in the optical system is concerned, in the case where a vector $(Ax_{v-1}, Ay_{v-1}, Az_{v-1})$ originating from the apex of the previous surface (v−1) so as to indicate the passing position of a light beam on this surface and a unit vector $(X_v, Y_v, Z_v)$ indicating the direction of the light beam emanating therefrom are given, a formula for computing a passing point $(Ax_v, Ay_v, Az_v)$ of the light beam in the surface v and a unit vector $(X_{v+1}, Y_{v+1}, Z_{v+1})$ indicating the direction of the light beam emanating therefrom should be established. Here, in order to study the relationship of optical paths in terms of vector, the amounts defined in FIG. 4 are defined as follows:

$T_{v-1}$: vector $(Ax_{v-1}, Ay_{v-1}, Az_{v-1})$ originating from the apex of the surface (v−1) so as to indicate the passing position of a light beam on this surface;

$Q_v$: unit vector $(X_v, Y_v, Z_v)$ indicating the direction of the light beam emanating from the surface (v−1);

$M_v$: vector $(M_{xv}, M_{yv}, M_{zv})$ indicating a perpendicular on $Q_v$ from the apex of the surface v;

$T_v$: vector $(Ax_v, Ay_v, Az_v)$ originating from the apex of the surface v so as to indicate the passing position of a light beam on this surface;

$E_v$: unit vector directed from the passing position of the light beam in the surface v toward the center of curvature of this surface (it indicates a normal of the surface);

$Q_{v+1}$: unit vector $(X_{v+1}, Y_{v+1}, Z_{v+1})$ indicating the direction of the light beam having passed through the surface v; and i: unit vector in the x-axis direction.

As a relationship between these vectors, the following expressions are obtained from FIG. 4:

$$T_{v-1} + p_v Q_v = d'_{v-1} i + M_v \\ M_v + (q_v - p_v) Q_v = T_v \\ T_v + Ar_v E_v = Ar_v i \\ E_v \times Q_{v+1} = |N_v/N'_v|(E_v \times Q_v)$$ (2)

(3)

Here, set of expressions (2) are relational expressions for determining the position of the passing position of the light beam in the surface v; whereas expression (3) is a relational expression, indicating the laws of refraction, for determining the direction of the light beam having passed through the surface v.

In the actual calculation, each vector is calculated as being resolved into its components, whereby the expressions can be arranged as follows:

i) Computing of light beam passing point (reference spherical surface)

$$P_v = -\{(Ax_{v-1} - d'_{v-1})X_v + Ay_{v-1}Y_v + Az_{v-1}Z_v\}$$ (4)

$$M_v = (Ax_{v-1} - d'_{v-1}) + p_v X_v$$ (5)

$$M_v^2 = (Ax_{v-1} - d'_{v-1})^2 + Ay_{v-1}^2 + Az_{v-1}^2 - p_v^2$$ (6)

$$q_v = P_v + \frac{\frac{M_v^2}{Ar_v} - 2M_v}{X_v\left(1 + \left\{1 - \frac{1}{Ar_v X_v^2}\left(\frac{M_v^2}{Ar_v} - 2M_v\right)\right\}^{1/2}\right)}$$ (7)

$$Ax_v = (Ax_{v-1} - d'_{v-1}) + q_v X_v \\ Ay_v = Ay_{v-1} + q_v Y_v \\ Az_v = Az_{v-1} + q_v Z_v$$ (8)

When the term within braces in the denominator in expression (7) is negative, it indicates that there is no intersection between the incident light beam and the reference spherical surface. Further, after the following amounts are calculated, the computing process shifts to ii)

$$l_v = 1 - (Ax_v/Ar_v) \\ m_v = -(Ay_v/Ar_v) \\ n_v = -(Az_v/Ar_v)$$ (9)

ii) Computing of refracted light beam $$Ao_v = (l_v^2 + m_v^2 + n_v^2)^{1/2}$$ (10)

$$\xi_v = (X_v l_v + Y_v m_v + Z_v n_v)/Ao_v$$ (11)

$$\xi'_v = \frac{N_v}{|N_v|}\frac{N'_v}{|N'_v|}\frac{\xi_v}{|\xi_v|}\left\{1 - \left(\frac{N_v}{N'_v}\right)^2(1 - \xi_v^2)\right\}^{1/2}$$ (12)

$$AG_v = \xi'_v - |N_v/N'_v|\xi_v$$ (13)

$$X_{v+1} \equiv X'_v = |N_v/N'_v|X_v + AG_v(l_v/Ao_v) \\ Y_{v+1} \equiv Y'_v = |N_v/N'_v|Y_v + AG_v(m_v/Ao_v) \\ Z_{v+1} \equiv Z'_v = |N_v/N'_v|Z_v + AG_v(n_v/Ao_v)$$ (14)

Here, $\xi v$ and $\xi' v$ respectively indicate cosine values of angles of incidence and refraction of the light beam.

In practice, since both surfaces of the plane plate 8 are planar, $Ar_v$ mentioned above is $\infty$, thus simplifying the above expressions as follows:

$$T_{v-1} + p_v Q_v = d'_{v-1} i + M_v \\ M_v + (q_v - p_v)Q_v = T_v \\ E_v = i$$ (2')

$$E_v \times Q_{v+1} = |N_v/N'_v|(E_v \times Q_v)$$ (3')

$$P_v = -\{(Ax_{v-1} - d'_{v-1})X_v + Ay_{v-1}Y_v + Az_{v-1}Z_v\}$$ (4')

$$M_{xv} = (Ax_{v-1} - d'_{v-1}) + p_v X_v$$ (5')

$$M_v^2 = (Ax_{v-1} - d'_{v-1})^2 + Ay_{v-1}^2 + Az_{v-1}^2 - p_v^2$$ (6')

$$q_v = p_v - M_{xv}/X_v$$ (7')

$$Ax_v = (Ax_{v-1} - d'_{v-1}) + q_v X_v \\ Ay_v = Ay_{v-1} + q_v Y_v \\ Az_v = Az_{v-1} + q_v Z_v$$ (8')

-continued $$l_v = 1 \brace m_v = 0 \brace n_v = 0 \quad (9')$$

$$Ao_v = 1 \quad (10')$$

$$\xi_v = X_v \quad (11')$$

$$\xi'_v = \frac{N_v}{|N_v|} \frac{N'_v}{|N'_v|} \frac{\xi_v}{|\xi_v|} \left\{ 1 - \left(\frac{N_v}{N'_v}\right)^2 (1 - \xi_v^2) \right\}^{1/2} \quad (12')$$

$$AG_v = \xi'_v - |N_v/N'_v|\xi_v \quad (13')$$

$$X_{v+1} \equiv X'_v = |N_v/N'_v|X_v + AG_v$$
$$Y_{v+1} \equiv Y'_v = |N_v/N'_v|Y_v \quad (14')$$
$$Z_{v+1} \equiv Z'_v = |N_v/N'_v|Z_v$$

Next, based on thus determined light beams, the following formula is used for determining the geometric thickness of the plane plate 8 at which the amount of spherical aberration is minimized.

Figure 5:
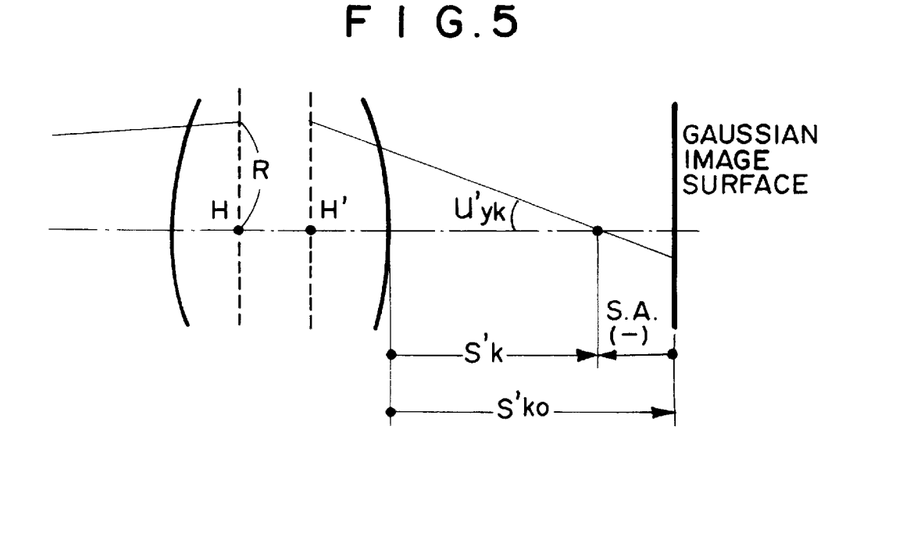
FIG. 5 is a graph for explaining the embodiment of the present invention.
Figure 6:
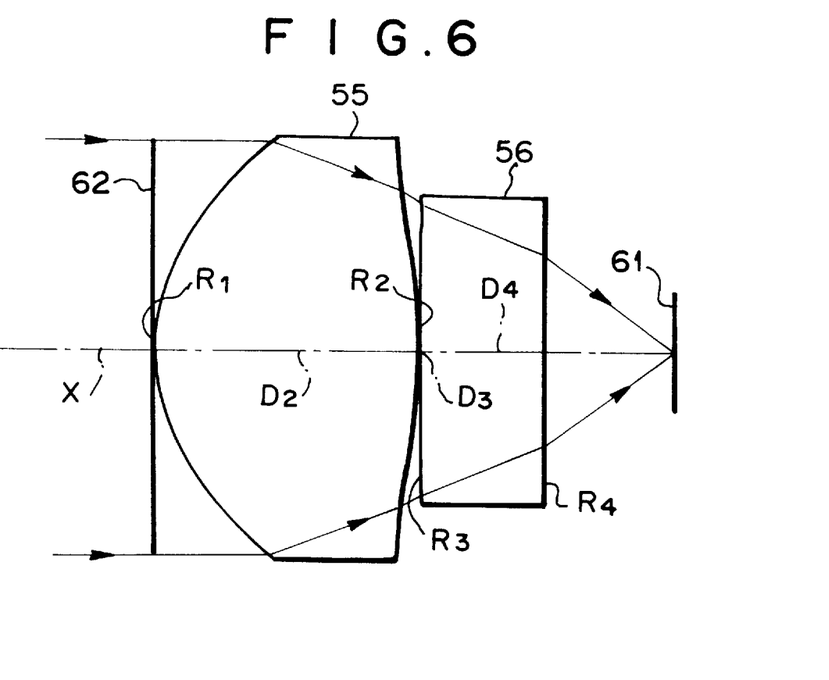
FIG. 6 is a schematic view showing an experiment in a case (A) set to a designed value.
Figure 7:
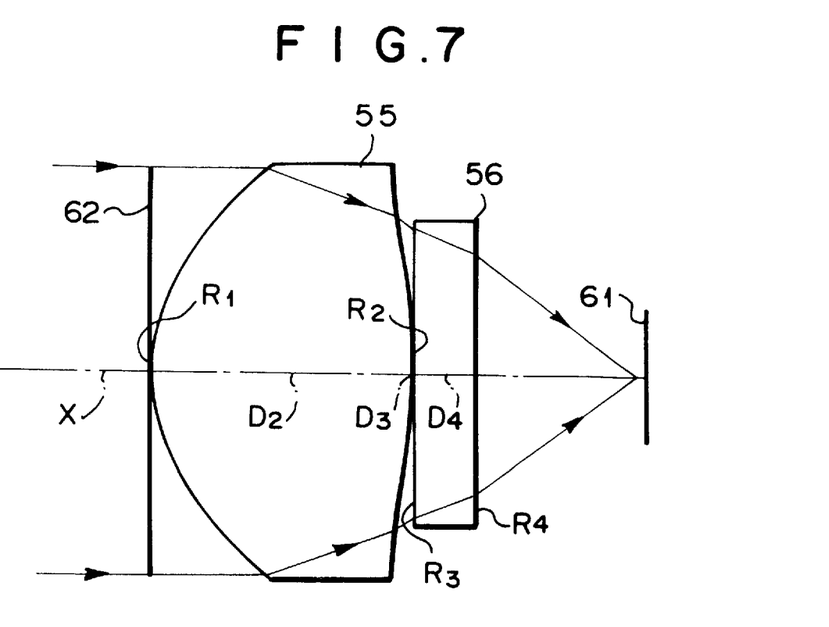
FIG. 7 is a schematic view showing an experiment in a case (B) where the thickness of a polycarbonate plate (corresponding to a disk thickness) is set to 0.6 mm, and no compensating plate is used.
Figure 8:
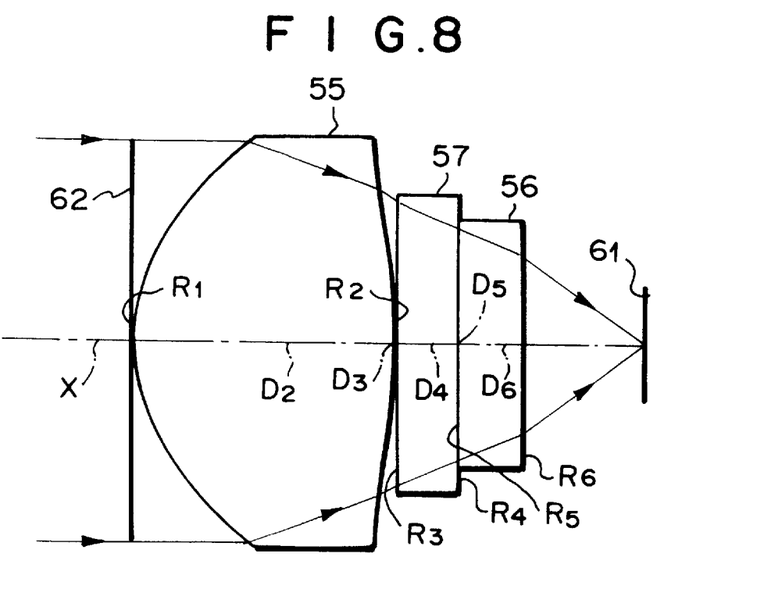
FIG. 8 is a schematic view showing an experiment in a case (C) where the thickness of a polycarbonate plate (corresponding to a disk thickness) is set to 0.6 mm, and a compensating plate corresponding to the polycarbonate optical thickness of 0.6 mm is inserted.
Figure 9:
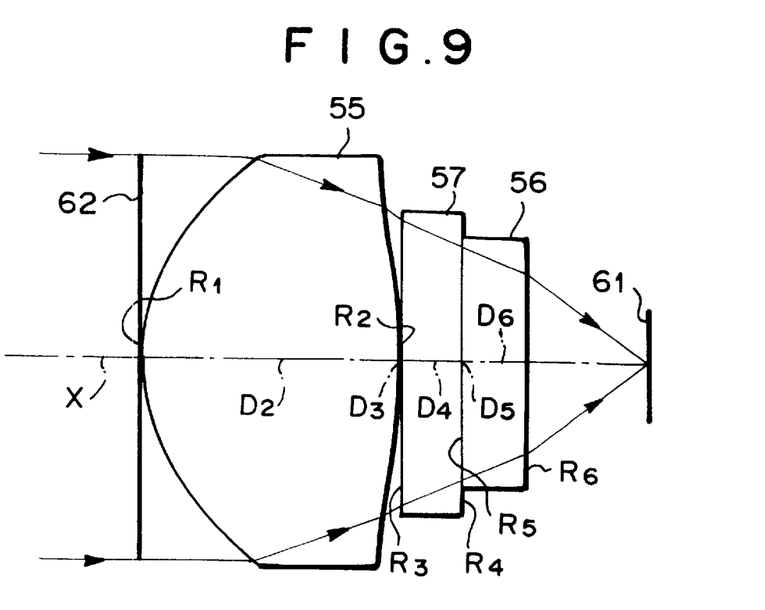
FIG. 9 is a schematic view showing an experiment in a case (D) (an example of the present invention) where the thickness of a polycarbonate plate (corresponding to a disk thickness) is set to 0.6 mm, and a compensating plate having a thickness determined in accordance with the embodiment is inserted.
Figure 10A:
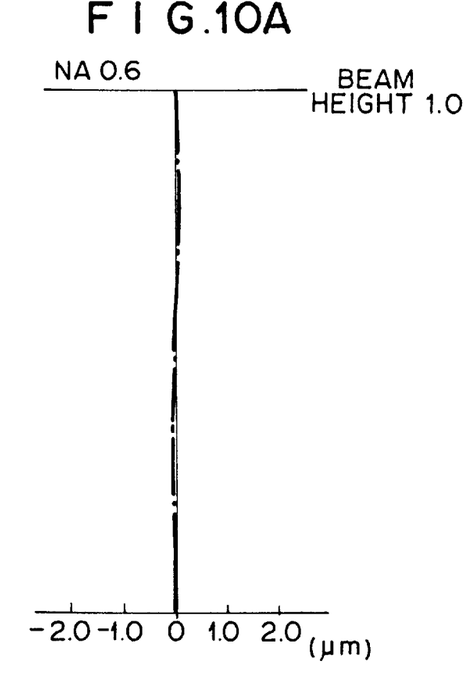
FIGS. 10(A), 10(B), 10(C), and 10(D) are respective spherical aberration charts in the above-mentioned cases of (A), (B), (C), and (D)
Figure 10B:
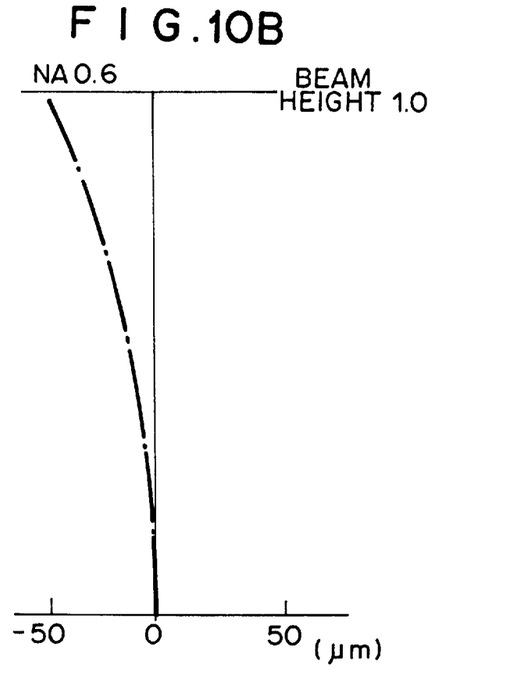
Figure 10C:
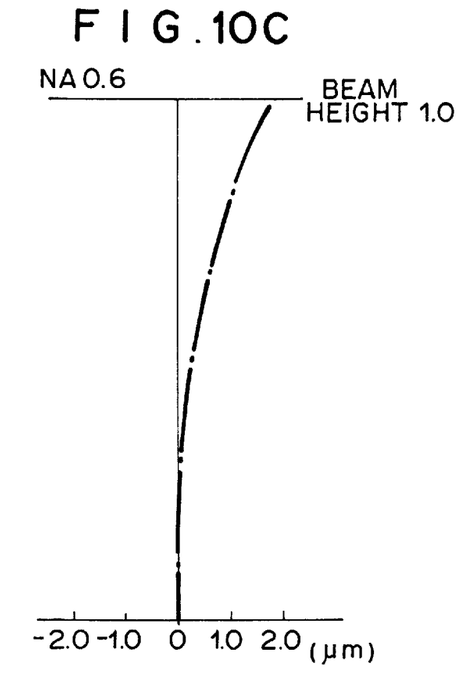
Figure 10D:
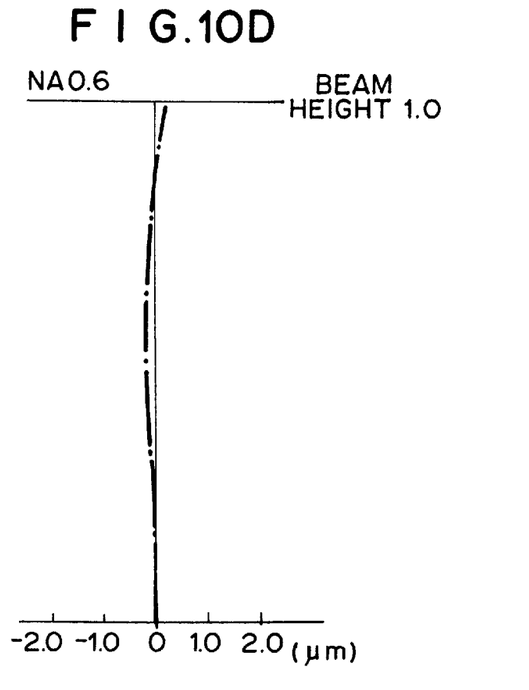

Spherical aberration, which indicates the imaging state of a light beam emanating from an object point on an optical axis, is generally expressed by longitudinal aberration (deviation of a convergent point measured with reference to a Gaussian image surface). As shown in FIG. 5, assuming that the position where a given light beam which emanates from an axial object point so as to be incident on the optical system intersects the optical axis is separated by $S_k'$ from the last surface, spherical aberration S.A. is given by:

$$S.A. \equiv S'_k - S'_{k0} \quad (15)$$

wherein Sk' is computed by:

$$S'_k = (Ay_k/\tan u'_{yk}) + Ax_k = Ax_k - (X'_k/Y'_k)Ay_k \quad (16)$$

Here, assuming that $$S'_k - S'_{k0} = \text{minimal value} \quad (17)$$

the above-mentioned geometric thickness of the plane plate 8 can be determined.

The curve of S.A. is such that a tangent at its root position is in parallel to the vertical axis.

For determining the geometric thickness of the plane plate 8 in practice, it is preferable to select a value at which the square root of the sum of squares of amounts of spherical aberration of respective light beams passing through the optical system is minimized.

EXAMPLE

In the following, an example of the present invention will be explained with reference to specific numerical data. Namely, Table 1(follows) shows the value of $S'_{k0}$ in each of a case (A) set to a designed value; a case (B) where the thickness of a polycarbonate plate (corresponding to a disk thickness) is set to 0.6 mm, and no compensating plate is used; a case (C) where the thickness of a polycarbonate plate (corresponding to a disk thickness) is set to 0.6 mm, and a compensating plate corresponding to the polycarbonate optical thickness of 0.6 mm is inserted; and a case (D) (an example of the present invention) where the thickness of a polycarbonate plate (corresponding to a disk thickness) is set to 0.6 mm, and a compensating plate having a thickness determined according to the embodiment is inserted. It also shows values of $Ax_k$ (mm), $Ay_k$ (mm), $X'_k$, $Y'_k$, $S'_k$, and $S'_k - S'_{k0}$ (spherical aberration; μm) obtained in each of the above-mentioned cases when the beam height (standardized by its stop diameter) is set at 1.0, 0.85, 0.70, and 0.50.

FIGS. 6 to 9 shows loci of light beams directed toward an imaging surface 61 in the respective cases (A) to (D) at a beam height of 1.0.

The above-mentioned designed value refers to the optimal designed value in the case where the thickness of a polycarbonate plate 56 (having a refractive index n of 1.58) is set to 1.2 mm when a lens 55 has an NA of 0.6. In the case (B), only the thickness of the polycarbonate plate 56 is changed to 0.6 mm as compared with the case (A). In the case (C), as compared with the case (A), the thickness of the polycarbonate plate 56 is changed to 0.6 mm, and a compensating plate 57 having a thickness of 0.626 mm whose material is made of BK-7 (having a refractive index n of 1.51454 and corresponding to a polycarbonate plate having an optical thickness of 0.6 mm) is inserted into the optical path. In the case (D) (Example), a compensating plate 57, whose material is made of BK-7, having a thickness of 0.607 mm is inserted in the optical path. The thickness of the compensating plate 57, i.e., 0.607 mm, in the case (D) (the present example) is determined by a calculation using the above-mentioned skew ray formula.

Here, the focal length of the lens 55 is 3.4 mm, the diameter of incident luminous flux is 4.08 mm, and the wavelength of the incident light is 635 nm. Also, the beam height is standardized by the diameter of a stop 62. For example, the beam height of 1.0 refers to the incident light from the outermost periphery of the stop 62, whereas the beam height of 0.85 refers to the incident light beam from a height which is 85% of the height of the outermost periphery of the stop 62.

Table 2 (follows) lists, for each of the above-mentioned cases (A) to (D), thickness of the disk being reproduced (thickness of polycarbonate), thickness of the compensating plate, amount of spherical aberration at each beam height, AD(sum of squares of individual spherical aberration amounts ), and square root of the AD(sum of squares of individual spherical aberration amounts).

As can be seen from Table 2, in the case of the present example (case (D)) in which the thickness of the compensating plate 57 is determined according to the above-mentioned embodiment, as compared with the case (C) in which the optical thickness of the compensating plate 57 is simply set so as to equal the 0.6 mm thickness of the polycarbonate, AD(sum of squares of individual spherical aberration amounts ) and its square root can be remarkably lowered, thereby approaching those of the designed value (case (A)).

FIGS. 10A to 10D are respective spherical aberration charts in the above-mentioned cases of (A), (B), (C), and (D).

Further, Table 3 (follows) shows lens data (radius of curvature R of each surface, surface distance D, and refractive index N of each optical member) in each of the cases (A) to (D).

While the radius of curvature of each of the surfaces 1 and 2 shown in Table 3 is the value of radius of curvature in the vicinity of the optical axis, each of the surfaces 1 and 2 as a whole is made as an aspheric surface represented by the following aspheric surface expression defined by Expression 1(follows), with their aspheric surface coefficients shown in Table 4 (follows).

Accordingly, the optical thickness of the plane plate 8 is set to a value at which, while the optical thickness difference between a DVD having a geometric thickness of 0.6 mm and a CD having a geometric thickness of 1.2 mm is accurately compensated for, spherical aberration can be made favorable even when the plane plate 8 is inserted.

A specific configuration for inserting and retracting the plane plate 8 comprises an actuator 9 for inserting/retracting the plane plate 8 into/from an optical path of the laser beam 2, a disk change-over switch 11 for changing orders according to the kind (thickness) of the optical disk 6 from which the signal is reproduced, and a controller 10 for driving the actuator 9 based on the change-over signal from the change-over switch 11. When a signal is to be reproduced from a DVD having a thickness of 0.6 mm, an operation for inserting the plane plate is ordered from the controller 10 to the actuator 9 in response to the change-over operation of the change-over switch 11 to the DVD side effected by a user. Accordingly, the plane plate 8 is inserted into the optical path of the laser beam 2. On the other hand, when a signal is to be reproduced from a CD having a thickness of 1.2 mm, an operation for retracting the plane plate is ordered from the controller 10 to the actuator 9 in response to the change-over operation of the change-over switch 11 to the CD side effected by the user. Accordingly, the plane plate 8 is retracted out of the optical path of the laser beam 2.

Of course, when a signal is to be reproduced from an optical disk which belongs to the same kind as the previous one, the actuator 9 effects neither inserting nor retracting operation since the change-over switch 11 is not changed over.

Figure 2:
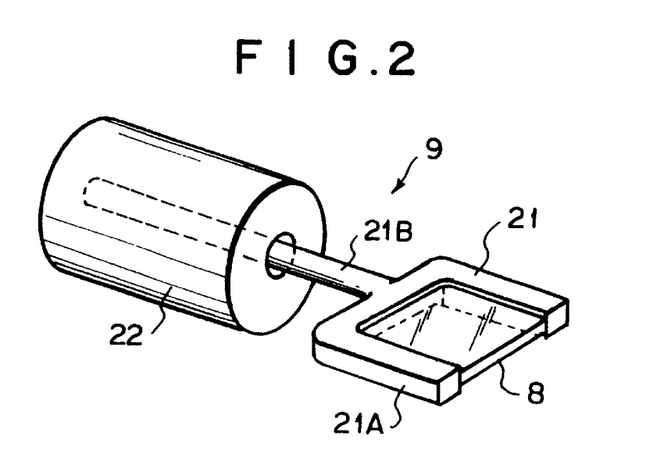
FIG. 2 is a view showing, in more detail, the actuator in the apparatus shown in FIG. 1.

Also, as shown in FIG. 2, the actuator 9 comprises a plane-plate movable portion 21, which is composed of a holder means 21A for holding the plane plate 8 and an axial portion 21B extending therefrom, and a solenoid portion 22 in which the axial portion 21B is inserted and by which, in response to the order signals from the controller 10, the axial portion 21B is electromagnetically drawn in and discharged therefrom. Without being restricted to this form, the actuator 9 may be of any type as long as it can move the plane plate 8 by a predetermined distance according to the order signals from the controller 10.

Figure 3A:
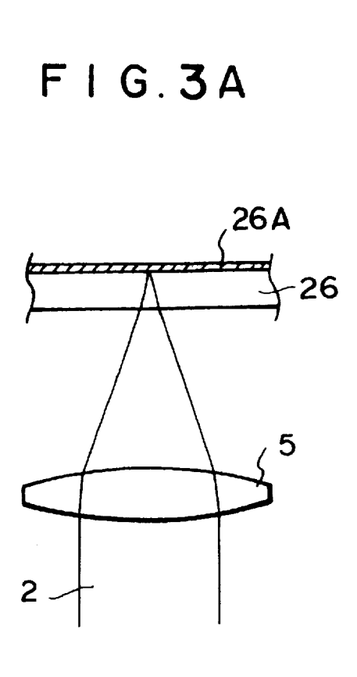
FIGS. 3(A) and 3(B) are views showing operations of the apparatus shown in FIG. 1.
Figure 3B:
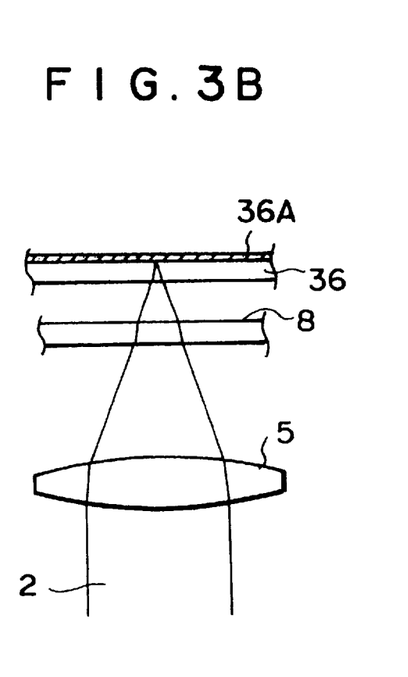

In the above-mentioned optical pickup apparatus, when a signal is to be reproduced from an optical disk 26 having a large disk thickness as shown in FIG. 3(A), the laser beam 2 can be focused on a recording surface 26A; while, when a signal is to be reproduced from an optical disk 36 having a small disk thickness as shown in FIG. 3(B), the laser beam 2 can be focused on a recording surface 36A. In any of these cases, focusing can be effected favorably.

Without being restricted to the above-mentioned embodiment, the optical pickup apparatus in accordance with the present invention can be modified in various manners.

For example, while the CD and DVD are changed over to each other as the user manually changes the change-over switch 11 according to the kind of the optical disk 6 in the apparatus of the foregoing embodiment, the kind of the optical disk mounted on a turntable may be automatically detected and, according to the results of detection, the operations for inserting and retracting the plane plate 8 may be automatically effected.

Also, without being restricted to CD and DVD, other kinds of optical disks such as LD and MD (mini disk) may be subjected to the optical pickup apparatus of the present invention.

Further, effects similar to those obtained when the plane plate 8 is inserted between the objective lens 5 and the optical disk 6 (26, 36) can also be obtained when the plane plate 8 is inserted at any place between the collimator lens 4 and the semiconductor laser 1.

TABLE 1

| | (A) Designed value | (B) Without Compensating plate | (C) Compensating plate with optical thickness equal to PC 0.6 mm | (D) Compensating plate with thickness determined according to embodiment |
|---|---|---|---|---|
| | Beam height (standardized by stop diameter) | | | |
| $S'_{k0}$ | 1.256520065 | 1.636266900 | 1.222940081 | 1.235485145 |
| 1.0 | | | | |
| $Ax_k$ (mm) | 0.000000000 | 0.000000000 | 0.000000000 | 0.000000000 |
| $Ay_k$ (mm) | 0.942275475 | 1.188551460 | 0.918481341 | 0.926678357 |
| $X'_k$ | 0.800034714 | 0.800034714 | 0.800034714 | 0.800034714 |
| $Y'_k$ | −0.599953712 | −0.599953712 | −0.599953712 | −0.599953712 |
| $S'_k$ (mm) | 1.256518752 | 1.584926316 | 1.224789416 | 1.235720088 |
| $S'_k - S'_{k0}$ (S.A.; μm) | −0.0013 | −51.3406 | 1.8493 | 0.2349 |
| 0.85 | | | | |
| $Ax_k$ (mm) | 0.000000000 | 0.000000000 | 0.000000000 | 0.000000000 |
| $Ay_k$ (mm) | 0.745110710 | 0.949764200 | 0.725860576 | 0.732656373 |
| $X'_k$ | 0.860135239 | 0.860135239 | 0.860135239 | 0.860135239 |
| $Y'_k$ | −0.510066046 | −0.510066046 | −0.510066046 | −0.510066046 |
| $S'_k$ (mm) | 1.256496064 | 1.601607604 | 1.224034153 | 1.235494050 |
| $S'_k - S'_{k0}$ (S.A.; μm) | −0.0240 | −34.6593 | 1.0941 | 0.0089 |
| 0.70 | | | | |
| $Ax_k$ (mm) | 0.000000000 | 0.000000000 | 0.000000000 | 0.000000000 |
| $Ay_k$ (mm) | 0.581540524 | 0.746985370 | 0.566303065 | 0.571787033 |
| $X'_k$ | 0.907525462 | 0.907525462 | 0.907525462 | 0.907525462 |
| $Y'_k$ | −0.419997066 | −0.419997066 | −0.419997066 | −0.419997066 |
| $S'_k$ (mm) | 1.256586950 | 1.614078519 | 1.223662001 | 1.235511704 |
| $S'_k - S'_{k0}$ (S.A.; μm) | 0.0669 | −22.1884 | 0.7219 | 0.0266 |

TABLE 1-continued

|  | (A) Designed value | (B) Without Compensating plate | (C) Compensating plate with optical thickness equal to PC 0.6 mm | (D) Compensating plate with thickness determined according to embodiment |
|---|---|---|---|---|
| 0.50 |  |  |  |  |
| $Ax_k$ (mm) | 0.000000000 | 0.000000000 | 0.000000000 | 0.000000000 |
| $Ay_k$ (mm) | 0.395052315 | 0.511065860 | 0.384584583 | 0.388423472 |
| $X'_k$ | 0.953955922 | 0.953955922 | 0.953955922 | 0.953955922 |
| $Y'_k$ | −0.299946828 | −0.299946828 | −0.299946828 | −0.299946828 |
| $S'_k$ (mm) | 1.256431009 | 1.625402434 | 1.223139259 | 1.235348526 |
| $S'_k-S'_{k0}$ (S.A.; μm) | −0.0891 | −10.8645 | 0.1992 | −0.1366 |

TABLE 2

|  | (A) Designed value | (B) Without Compensating plate | (C) Compensating plate with optical thickness equal to PC 0.6 mm | (D) Compensating plate with thickness determined according to embodiment |
|---|---|---|---|---|
| Reproduced disk thickness (mm) | 1.2 | 0.6 | 0.6 | 0.6 |
| Compensating plate thickness (mm) | — | 0.0 | 0.626 | 0.607 |
| S.A. at beam height of 1.0 (μm) | −0.0013 | −51.3406 | 1.8493 | 0.2349 |
| S.A. at beam height of 0.85 (μm) | −0.0240 | −34.6593 | 1.0941 | 0.0089 |
| S.A. at beam height of 0.70 (μm) | 0.0669 | −22.1884 | 0.7219 | 0.0266 |
| S.A. at beam height of 0.50 (μm) | −0.0891 | −10.8645 | 0.1992 | −0.1366 |
| AD (Sum of squares of individual S.A. amounts) | 0.01299 | 4447.48674 | 5.17779 | 0.07462 |
| Square root of AD | 0.1140 | 66.6895 | 2.2755 | 0.2732 |

TABLE 3

Lens date

| surface | R | D | N |
|---|---|---|---|
| (A) Designed value | | | |
| 1 | 2.10068066 | | |
| 2 | −4.77632074 | 2.6000 | 1.49005 |
| 3 | ∞ | 0.0000 | 1.00000 |
| 4 | ∞ | 1.2000 | 1.58000 |
| (B) Without compensating plate | | | |
| 1 | 2.10068066 | | |
| 2 | −4.77632074 | 2.6000 | 1.49005 |
| 3 | ∞ | 0.0000 | 1.00000 |
| 4 | ∞ | 0.6000 | 1.58000 |
| (C) With insertion of compensating plate having an optical thickness equal to 0.6 mm PC | | | |
| 1 | 2.10068066 | | |
| 2 | −4.77632074 | 2.6000 | 1.49005 |
| 3 | ∞ | 0.0000 | 1.00000 |
| 4 | ∞ | 0.6000 | 1.58000 |
| 5 | ∞ | 0.0000 | 1.00000 |
| 6 | ∞ | 0.6260 | 1.51454 |

TABLE 3-continued

Lens date

| surface | R | D | N |
|---|---|---|---|
| (D) With insertion of compensating plate having a thickness determined according to embodiment | | | |
| 1 | 2.10068066 | | |
| 2 | −4.77632074 | 2.6000 | 1.49005 |
| 3 | ∞ | 0.0000 | 1.00000 |
| 4 | ∞ | 0.6000 | 1.58000 |
| 5 | ∞ | 0.0000 | 1.00000 |
| 6 | ∞ | 0.6070 | 1.51454 |

Expression 1

$$X = CY^2/\{1 + (1 - KC^2Y^2)^{1/2}\} + \sum_{i=2}^{5} A_i Y^{2i}$$

Y ... height from optical axis
X ... depth
C = 1/R

TABLE 4

| | Aspherical surface coefficient | | | | |
|---|---|---|---|---|---|
| Surface | A2 | A3 | A4 | A5 | K |
| 1 | $4.492574964 \times 10^{-3}$ | $3.319091738 \times 10^{-4}$ | $-1.184990409 \times 10^{-5}$ | $7.854516049 \times 10^{-6}$ | $1.603804126 \times 10^{-1}$ |
| 2 | $7.257121809 \times 10^{-3}$ | $-1.813253567 \times 10^{-3}$ | $4.390975137 \times 10^{-4}$ | $-4.948854368 \times 10^{-5}$ | $-1.669604076 \times 10^{1}$ |

What is claimed is:

1. An optical pickup apparatus comprising:

an objective lens for focusing, on an optical disk, a light beam from a laser source;

an optical transparent plane plate for compensating for optical path length, said optical transparent plane plate being disposed outside said light beam when said optical disk is a first optical disk having an optical thickness set to $T_1$, said optical transparent plane plate being disposed in said light beam when said optical disk is a second optical disk having an optical thickness set to $T_2$ which is smaller than $T_1$, said optical transparent plane plate having an optical thickness set to t;

a plane-plate moving actuator for effecting an operation for inserting said optical transparent plane plate into said light beam and an operation for retracting said optical transparent plane plate from said light beam; and a controller for ordering said plane-plate moving actuator to change over between the operations for inserting and retracting said optical transparent plane plate according to a kind of the optical disk which is set;

wherein the optical thickness t of said optical transparent plane plate is set by means of skew ray formula so that an amount of spherical aberration caused by an optical system disposed in said light beam is set so as to be smaller than that obtained when t is set to $T_1-T_2$.

2. An optical pickup apparatus according to claim 1, wherein said amount of spherical aberration is defined by the following expression (1):

$$\text{amount of spherical aberration} = S'_k - S'_{k0} \quad (1)$$

wherein:

$S'_k = Ax_k - (X'_k/Y'_k)Ay_k$;

k is the last lens surface;

$S'_{k0}$ is a distance from the k surface to a Gaussian image surface;

$Ax_k$ and $Ay_k$ are respectively X component and Y component of a vector indicating a position of the light beam passing through the k surface where an intersection between the k surface and an optical axis is defined as an origin (origin of coordinates); and $X'_k$ and $Y'_k$ are respectively X component and Y component of a unit vector indicating a direction of the light beam having passed through the k surface; and wherein a coordinate system thereof is a left-hand system in which a direction of X axis is defined as an optical axis direction.

3. An optical pickup apparatus according to claim 2, wherein a minimum level of the amount of spherical aberration caused by said optical system is defined by a minimum value of a square root of sum of squares of amounts of spherical aberration of respective light beams passing through said optical system.

* * * * *